Figure 1:
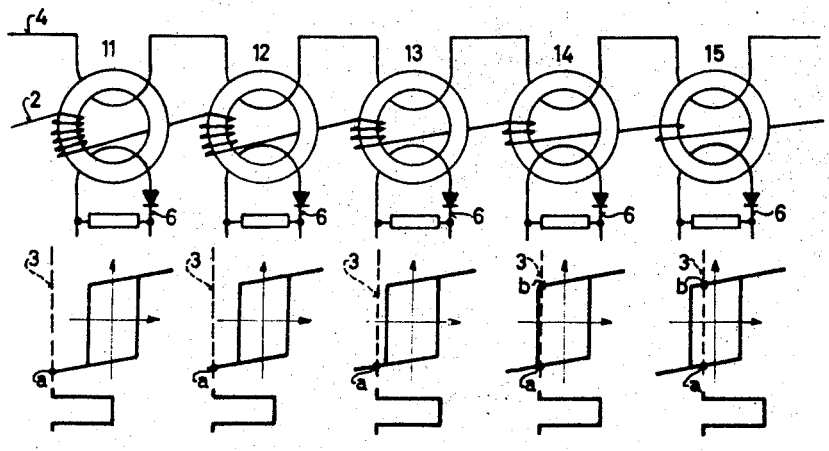

Nov. 29, 1960  R. BUSER  2,962,704
MEASURING ELECTRIC CURRENTS IN TERMS OF UNITS
Filed Sept. 25, 1956

United States Patent Office 2,962,704
Patented Nov. 29, 1960

2,962,704
MEASURING ELECTRIC CURRENTS IN TERMS OF UNITS

Rudolf Buser, Munich, Germany, assignor to Siemens & Halske Aktiengesellschaft Berlin and Munich, a corporation of Germany Filed Sept. 25, 1956, Ser. No. 612,014

Claims priority, application Germany Sept. 29, 1955

11 Claims. (Cl. 340—347)

This invention is concerned with an arrangement for measuring and indicating electric currents in terms of whole units, especially in digital form, as distinguished from the customary measuring of current values according to steady increments.

A measuring arrangement according to the invention is of great practical importance especially in cases where the results of the measurement are to be recorded in some way, for example, printed on a record carrier. In such cases, only a certain numerical value delimited with a certain unit is to be recorded. An arrangement according to the invention is accordingly useful for example in connection with current meters or in case of all kinds of devices for recording operating or supervising data in which a measuring result is to be printed or recorded in predetermined time intervals in the form of perforated tape for use in determining charges or the like at an evaluation place.

The arrangement according to the invention will be presently explained and described in connection with an example relating to the measuring of current. However, such example is not given in a limiting sense because the arrangement may be utilized for measuring all values that may be expressed by an electric current or transformed or converted into an electric current. It is therefore evidently possible to determine with the use of an arrangement according to the invention voltages as well as other electric or mechanical values, for example, pressure and the like, which may be converted into electric current in known manner, for example, by resistor means subjected to pressure or expansion. The arrangement according to the invention is accordingly, generally speaking, applicable for the recording of variable values, which may be converted into an electric current, in terms of units of a predetermined numerical system.

The arrangement according to the invention provides a set of magnet cores with approximately rectangular hysteresis loop all of which are in chained relationship with a measuring loop (measuring line) carrying the measuring current and with a loop (impulse line) carrying pulsing current. The measuring current and the pulsing current induce within the cores oppositely directed fields. The magnetic behavior of the cores is stage by stage tuned, preferably by different coupling, in such a manner that only certain predetermined cores change their condition of magnetization.

The reverse magnetization of the cores is in accordance with another feature utilized for the desired indication purposes.

Summing up, in the arrangement according to the invention, the measuring current is used for premagnetizing a series of magnet cores with rectangular hysteresis loop, such current producing in the cores different fields, so that condition of saturation is obtained in part of the cores only. The individual cores are in addition affected by a pulsing current, for example, by timing pulses, effecting due to the premagnetization and the impulses used, recurring reverse magnetization always of only a certain predetermined core or cores.

Figure 2:
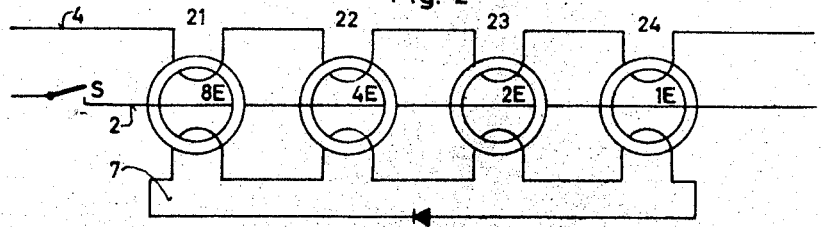
Figure 3:
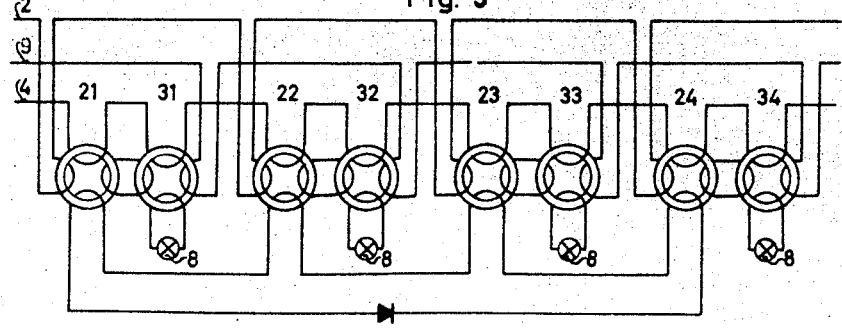

The foregoing and other objects and features of the invention will appear from the description which will be rendered below with reference to the accompanying drawing, wherein Fig. 1 shows an embodiment comprising magnet cores in chain circuit with a measuring line and an impulse line;

Fig. 2 indicates an embodiment similar to Fig. 1 but providing in addition to the measuring and impulse lines a closed current loop in chain circuit with the magnet cores; and Fig. 3 illustrates an embodiment providing further magnet cores for decoupling the indicating devices.

Referring now to Fig. 1, there are provided a plurality of principal magnet cores 11 to 15 in chain circuit with a line 2 traversed by the current to be measured. This line 2 induces in the individual cores different fields due to the provision, on each core, of a coil of different number of turns. It is assumed in the illustrated example, that the core 11 carries more than five turns of the line 2, the core 12 carrying four turns and so forth. Assuming a given measuring current, each core will accordingly be premagnetized in a definitely determined different manner. This is also apparent from the diagrams shown underneath the respective cores and from the dotted lines 3 showing the magnitude of the fields induced by the measuring current.

The individual principal cores 11 to 15 are also in a chain circuit with a line 4 which is traversed by a pulsing direct current. Such current induces in the respective cores a definitely determined field which exceeds somewhat a value corresponding to twice the coercive force of the cores. The magnitudes and directions of these fields are indicated underneath the respective individual hysteresis loops. These latter fields are superposed upon the fields which are induced by the measuring current flowing over the line 2.

As will be seen from the individual diagrams, the cores 11 and 12 retain their respective magnetization condition—point $a$ of the curve—which has been impressed thereon by the premagnetization. The premagnetization of the core 13 is compensated by the magnetic field of the impulse current flowing over line 4. The magnetization of the core thereby flips from the initial point $a$ into the opposite condition. Upon conclusion of each individual impulse, the magnetization is restored to the initial condition by the measuring current. This continuous flipping over induces in the respectively associated line 6 (indication or signaling line) a current that may be directly used for the desired indication.

While the cores 14 and 15 are upon occurrence of the first impulse also magnetized in reverse direction—point $b$ on the curve—the measuring current cannot magnetize these cores to the initial condition (point $a$) because the premagnetization is too low. Accordingly, by providing for the individual windings 6 of the cores 11 to 15 suitable indicating elements, for example, glow lamps, relays or the like (not shown in Fig. 1 but indicated in Fig. 3) only the indicating element allotted to the core 13 will be definitely recurrently energized.

If the measuring current is on the other hand somewhat higher or lower, the core 14 or the core 12 will respond, as will be easily seen from the diagram, because the premagnetization which is produced by the measuring current will be correspondingly higher or lower.

Fig. 2 illustrates an embodiment which makes it possible to read directly the measuring value in units which are expressed in binary numbers. Such an arrangement has various advantages as compared with the arrangement according to Fig. 1. In the first place, the arrangement according to Fig. 2 requires for a total of fifteen measuring units only four magnet cores as compared with fifteen cores that would be required in an arrangement according to Fig. 1 to obtain the desired results. In the second place, the measuring values which are in the arrangement according to Fig. 2 delivered in binary numbers, can be directly fed to a digitally operating evaluating device such as a calculating machine.

The embodiment according to Fig. 2 differs from that shown in Fig. 1 primarily by the provision, in addition to the measuring line 2 and the impulse line 4 of a closed current loop 7 in chain circuit with the individual principal magnet cores. This closed current loop 7 conducts the current flowing in one direction, induced by the individual cores, to the other cores. The different coupling of the measuring line 2 with the individual cores has not been specifically illustrated in Fig. 2. The labelling on Fig. 2 of 8E, 4E, 2E, 1E, however, indicates that the first core 21 is recurrently reversed after at least 8 units, the core 22 at least after 4 units, and the core 24 at least after 1 unit of the measuring current. Accordingly, a current corresponding respectively to eight, four, two, units or one unit will be induced in the circuit 7.

The arrangement operates as follows:

If a current corresponding for example to thirteen units flows over the measuring line 2, the condition of the core 21 will be repeatedly or recurrently changed, thereby producing in the line 7 a current corresponding to eight current units. The magnetization of the core 21 is in addition repeatedly changed so that the opposing current of the core 21 is superimposed by a further current of the core 22 with four units. Accordingly, a current corresponding to twelve units will flow in the circuit 7. The core 23 is dimensioned so as to require for its opposite magnetization at least two units; accordingly, the measuring current amounting to thirteen units, cannot magnetize this core in opposite direction because the opposing current of the winding 7, with twelve units, permits only one unit to be effective for opposite magnetization. The core 24, however, which is oppositely magnetized with one unit, changes its magnetization condition repeatedly. It follows, therefore, that, if a current corresponding to thirteen units flows over line 2, the cores 21, 22 and 24 will respond, and an indicating device associated with the individual cores (not shown) will show a number 1101, the cipher 1 indicating opposite magnetization and 0 a constant magnetization condition. The binary number 1101 corresponds as is known to the decimal number 13.

Nothing will be changed in the explained conditions if the measuring current should amount to 13.5 units, because the core 23 cannot be oppositely magnetized in such a case as in the assumed case. Only if the measuring current should amount to fourteen units will the core 23 be oppositely magnetized. In such a case, a current corresponding to two further units would superimpose itself upon the opposing current in the line 7, and fourteen units of measuring current would accordingly flow in the core 24, Therefore, nothing would be changed as regards the magnetizing condition of this core. The indicating device would show the binary number 1110 as a measuring result, which corresponds to the decimal number 14. The measuring current is incident to each measurement connected by way of a switch S. The impulse line serves for restoring the cores during the pauses between taking measurements.

The described arrangement may be directly used for the conversion of numbers of a desired number system into numbers of the binary system. In such case of use, the current is simply adjusted in accordance with the magnitude of the number to be converted, and the corresponding binary number can then be read as described from the indications provided by the magnet cores 21 to 24. The arrangement is workable; it operates accordingly as a coder or analog digital converter.

Fig. 3 shows a variant of the embodiment illustrated in Fig. 2. It will be seen from Fig. 3 that it may be of advantage to uncouple the indicating elements, shown as glow lamps 8, by means of further magnet cores, so as to avoid overloading the individual (principal) magnet cores with currents required for indication. For this purpose, there are associated with the respective principal cores 21, 22, 23, 24 further cores respectively indicated at 31, 32, 33, 34. These cores are also coupled with the impulse line 4. A line 9 is provided for imparting to the cores 31 to 34 predetermined magnetizing conditions. The arrangement corresponds otherwise to the embodiment shown in Fig. 2, that is, the measuring cores are among others connected in a chain circuit with a load loop.

In case it is desired to control by means of the measuring circuit, relays requiring more current than the magnet cores with rectangular hysteresis loop can supply, suitable amplifiers, magnetic amplifiers and the like may be used at desired points without departnig from the invention.

Changes may be made within the scope and spirit of the appended claims.

I claim:

1. Arrangement for measuring in digital form continually varying electrical values for the purpose of indication thereof in terms of binary numbers, comprising a plurality of principal magnet cores with approximately rectangular hysteresis loop, a measuring line traversed by current to be measured and having portions thereof about successive cores in predetermined manner to provide different degrees of magnetization in the respective cores, an impulse line traversed by pulsating current and having portions thereof looped about successive principal cores in another predetermined manner, the current flowing respectively in said measuring line and in said impulse line inducing in said principal cores oppositely poled fields, the looipng of said measuring and said impulse lines about said principal cores causing recurrent changes in the magnetic condition only in predetermined cores, and signaling means utilizing said changes to indicate the current values corresponding thereto.

2. An arrangement according to claim 1, wherein said current flowing in said measuring line is a pulsing current.

3. An arrangement according to claim 1, wherein the number of turns of each portion of said measuring line looped about the respective principal cores is different from each other portion, and wherein the portions of said impulse line which are looped about the respective magnet cores are of substantially identical value.

4. An arrangement according to claim 1, wherein said principal cores are due to said lines looped thereabout tuned for magnetic action such that one principal core whose magnetization is recurrently changed responsive to current of low magnitude is followed by a principal core whose magnetization changes responsive to current of twice such magnitude.

5. An arrangement according to claim 4, comprising a conductor forming a closed circuit having portions looped similarly about the respective principal cores.

6. An arrangement according to claim 4, comprising a conductor forming a closed circuit having portions looped similarly about the respective principal cores, and a rectifier disposed in said circuit.

7. An arrangement according to claim 1, wherein said signaling means comprises individual signaling means for each principal core, said individual signaling means comprising circuit means including a conductor cooperatively associated with the corresponding principal core.

8. An arrangement according to claim 1, wherein said signaling means comprises individual signaling means for each principal core, said individual signaling means comprising an element for and separate from each principal core, and circuit means for said element to indicate the current changes occurring in the principal core allotted to the respective element.

9. An arrangement according to claim 1, wherein said signaling means comprises individual signaling means for each principal core, said individual signaling means comprising a further core magnetically linked with its corresponding principal core, and circuit means including a conductor looped about said further core.

10. An arrangement according to claim 1, wherein said signaling means comprises individual signaling means for each principal core, said individual signaling means comprising a further core with approximately rectangular hysteresis loop magnetically linked with its corresponding principal core, said impulse line having portions looped about said further core, and circuit means including a conductor looped about said further core.

11. An arrangement according to claim 1, comprising means for converting the changes indicated by said signaling means into electric current analogous thereto.

References Cited in the file of this patent

UNITED STATES PATENTS

| | | |
|---|---|---|
| 2,719,773 | Karnaugh | Oct. 4, 1955 |
| 2,738,504 | Gray | Mar. 13, 1956 |
| 2,762,935 | Chow | Sept. 11, 1956 |
| 2,851,677 | Crooks | Sept. 9, 1958 |